May 11, 1965     A. C. BROCKMAN     3,182,986
RESILIENT BUSHING STRUCTURE
Filed Sept. 4, 1963
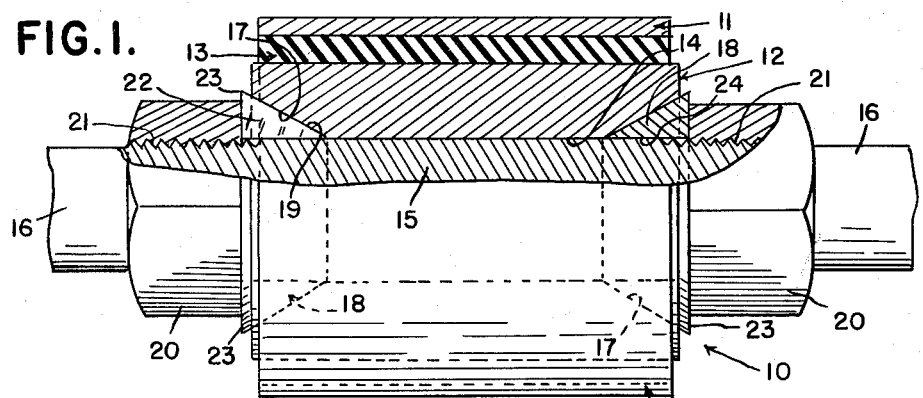
FIG. 1.
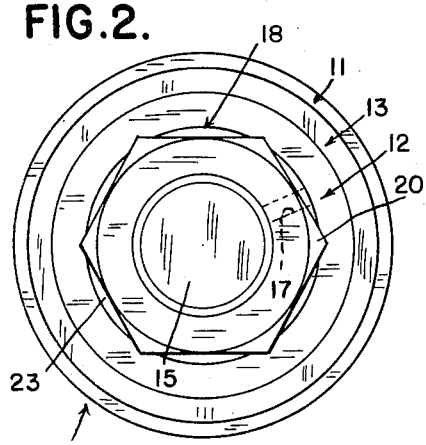
FIG. 2.
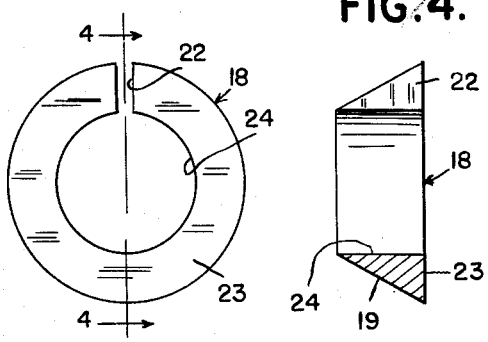
FIG. 3.
FIG. 4.
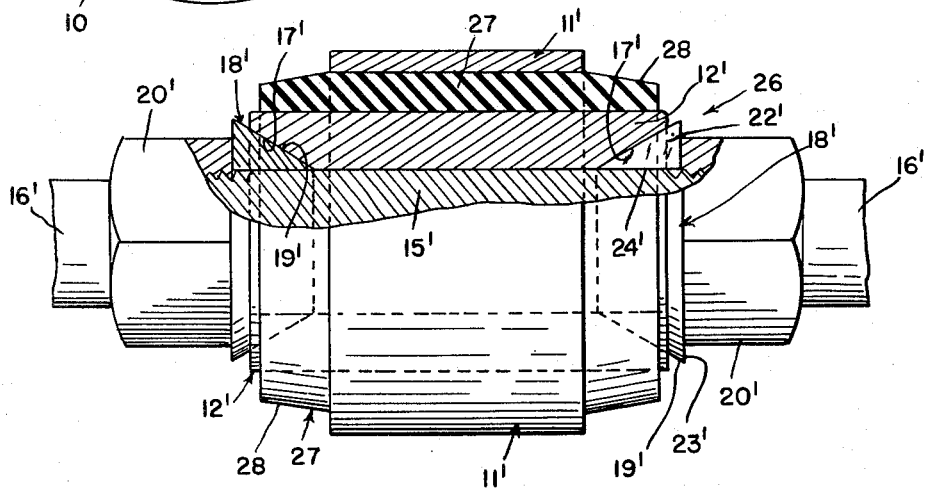
FIG. 5.
INVENTOR.
ARTHUR C. BROCKMAN
BY
ATTORNEYS

United States Patent Office 3,182,986
Patented May 11, 1965

1

3,182,986
RESILIENT BUSHING STRUCTURE
Arthur C. Brockman, 10101 Ford Road, Dearborn, Mich.
Filed Sept. 4, 1963, Ser. No. 306,467
4 Claims. (Cl. 267—1)

The present invention relates to an improved resilient bushing structure for uses in various types of mechanical couplings and the like in which there is a need for the bushing to accommodate multi-directional twist or tilt stresses. An example is an installation of one or more of the improved bushings in an axle suspension, in which the normal operation requires the bushing to effect a resiliently yieldable connection of a drawbar or the like between a mobile frame and an axle on which such frame is supported. However, the invention is by no means limited to an application of this sort; on the contrary, it is widely adapted for applications in which multiple tilting or twisting torque and compressive stress in a plane including the bushing axis, must be absorbed at a connection between two coacting, rigid annular or cylindrical members.

It is an object of the invention to provide an improved bushing for such uses which incorporates an annular outer rigid member adapted to be fixedly connected to one of two parts or devices coupled by the bushing; a coaxial annular, rigid inner member adapted to be connected to another coupled part or device, as at a rigid shaft or stem extending through the bore of the inner member; an annular, resiliently deformable bushing sleeve interposed between the inner and outer members to receive multi-directional tilting, twisting, compressive and like stresses occasioned by lateral movements of said inner and outer members relative to one another; and improved lock washer and bolt means applied to the shaft to secure the inner bushing member fixedly and rigidly to the shaft, in a manner to successfully resist loosening or separation of the inner member from the shaft over a long period of operation under severely stressing conditions.

More specifically, it is an object to provide a resilient bushing structure having the components mentioned above, in which the inner rigid, annular member is provided at opposite axial ends of its bore with frusto-conical counterbores or annular recesses surrounding the intermediate portion of the shaft or stem, and in which a generally frusto-conical split lock washer is received within each of the frusto-conical recesses in accurately mating engagement with the inclined surface of the latter, with lock bolts threadedly engaged on the shaft or stem axially outwardly of the respective washers and tightly drawn up against the outer, radially extending surfaces of the latter; thus to strongly engage the washers between the shaft and respective surfaces of the inner rigid annular member to lock the latter and the remainder of the bushing structure very tightly to the shaft.

A more specific object still is to provide a resilient bushing structure of this nature, in which the rigid inner annular member is a steel one, the coacting outer rigid member being preferably of the same metal; in which the split annular, frusto-conical washer is fabricated of aluminum; and in which the lock bolts and shaft are of steel. Thus, with the parts taken up by tightening of the bolts, a very high frictional restraint is exerted by each bolt on the radial washer surface; and a correspondingly high frictional restraint is exerted by the frusto-cone surface of the washer at the mating annular surface of the inner bushing member, due to the high static coefficient of friction characterizing aluminum on steel, as well as at the shaft.

Another and more detailed object is to provide bushing means of the sort described, in which, although there is a relatively tight fit of the intermediate resilient bushing sleeve between the rigid inner and outer annular coupling members, this connection is not a fixedly bonded one of the resilient part to either of the rigid parts, so that some degree of relatively free coaxial rotation of the inner and outer members is permitted. The mutually facing annular surfaces of said members are preferably specially coated, prior to assembly thereof with the resilient sleeve, for this purpose.

The foregoing as well as other objects will become more apparent as this description proceeds, especially when considered in connection with the accompanying drawing illustrating the invention, wherein:

FIG. 1 is a fragmentary side elevational view, partially broken away and in section in an axial plane, of one embodiment of the improved resilient bushing means;

FIG. 2 is an axial end view of this structure;

FIG. 3 is an end view of the split aluminum washer of the bushing;

FIG. 4 is a view in section on line 4—4 of FIG. 3; and

FIG. 5 is a view similar to FIG. 1 of a second embodiment of the bushing structure.

Such structure, as illustrated in FIGS. 1 through 4, is generally designated by the reference numeral 10. It comprises a rigid cylindrical outer member or annular sleeve 11 of a steel adapted as to hardness, wearability and the like to the particular application to which bushing 10 is to be put. The member 11 may be an integral part of one of two devices to be coupled, or it may be connected fixedly or relatively movably to such device.

Bushing structure 10 also includes an inner rigid annular sleeve member 12 of a suitable radial thickness and cylindrical in shape, the member 12 being also of steel of appropriately selected composition; and a natural or synthetic rubber or other resiliently deformable cushioning sleeve 13 is interposed between the annular members 11, 12 in snug engagement with both. Preferably, and since it is not contemplated that the coupling 10 will materially resist rotative twisting torque truly coaxial with and about the axis of members 11, 12, the surfaces of the latter are provided with a phosphate coat before assembly to the cushion-sleeve 13.

The bore 14 of the inner rigid member 12 surrounds the intermediate axial portion of a rigid shaft or stem 15, whose axially outwardly projecting ends 16 on either end of the bushing 10 are adapted to be fixedly or relatively movably connected to a second of the devices or parts coupled at the bushing 10, as in the arms of a clevis or like connecting member, not shown. The shaft 15 is of an appropriate steel suitable for its load bearing function. Thus shaft 15 and outer rigid sleeve member 11 are adapted to couple such devices in a manner to resiliently absorb tilting or twisting stresses applied to member 11 in planes at various angles parallelling and including the axis of the bushing unit 10.

In accordance with the invention, the shaft 15 receives the inner rigid member 12 with a sufficient radial clearance at the bore 14 of the latter to facilitate ready assembly; and the annular inner member 12 is formed at each of the axially opposite ends of said bore to provide a frusto-conically shaped counterbore or recess 17. The annular inclined surface of this recess diverges at an angle of, say, 30° from the axis of bushing 10.

Washers 18, as shown in FIGS. 3 and 4, are provided for reception in the respective recesses 17, these washers having external frusto-conical surfaces 19 accurately formed at an angle the same as the inclined surfaces of the recess of counterbore 17 of member 12 for mating engagement in the latter, as shown in FIG. 1. The axial length of the washer 18 exceeds the axial depth of the recess 17, for axial compressive engagement with each washer 18 of a locking or clamp nut 20, preferably of steel, which is threaded at 21 on the shaft 15.

In further accordance with the invention, the frusto-conical bushing washers 18 are fabricated of aluminum, and are split at a radial slot 22 of substantial circumferential width, thus permitting substantial compressive and constrictive flexure of the washers 18 as the lock nuts 20 are taken up tightly.

As thus tightened, due to the relatively high coefficient of friction of the aluminum on steel engaging surfaces, i.e., between washer 18 and inner member 12 at recess 17, between the nut 20 and washer 18 at the radially extending, planar surface 23 of the washer and between the washer and shaft 15 at the inner annular, cylindrical surface 24 of the washer. The frictional coefficient amounts to 0.61 for aluminum on mild steel in dry static engagement (Mechanical Engineers Handbook—Marks, p. 340, 1958 edition). This is in substantial excess of the coefficients of friction of other, similarly composed metal materials, such as are ordinarily employed in non-bearing applications, in dry static engagement with one another; and it is practically impossible to accidentally dislodge these parts from fixed relation to one another at any of the pairs of engaging surfaces mentioned above under severe operational shock and other stresses.

The mentioned angularity of the conical washer surface 19 and of recess 17 relative to the axis, i.e., of the order of 30°, enables an adequately strong axial force to be transmitted by washer 18 to provide a tight clamp action at the high coefficient of friction, steel and aluminum surfaces to resist loosening, and also to more efficiently receive the tilting forces in and through the plane of the axis.

Despite the most severe sort of tilt of outer rigid member 11 relative to inner member 12, from top-to-bottom, front-to-rear or intermediate thereof, in planes through the axis of bushing 10, the washers 18 and tightly taken up lock nuts 20 have been found, in all instances and throughout extended periods of rugged operation, to hold the assembly of outer sleeve 11, cushioning sleeve 13 and inner sleeve 12 without movement of the latter relative to shaft or stem 15.

The embodiment of the invention shown in FIG. 5, generally designated 26, so closely resembles the one appearing in FIG. 1 that corresponding reference numerals, primed, are employed to designate corresponding parts (substantially identical except, perhaps, in regard to radial and axial dimensioning); and further description of the second embodiment 26 of the bushing structure is dispensed with.

Here, the outer sleeve 11' is shown of substantially lesser axial extent than the outer member 11, relative to the inner rigid member 12'; and the interposed, resiliently deformable, annular cushioning member or sleeve, specially designated 27 in this form, substantially over-extends member 11' at both of its axial ends, in externally tapered, integral formations 28 of member 27. Thus, the bushing 26 affords a somewhat greater range of tilting or twisting movements of member 11' relative to inner member 12' and shaft 15' than the embodiment 10, with an external sleeving of the outer rigid annular member 12' up to both of its axial ends. In general, however, the action of the bushings 26 and 10 in coupling two parts or devices in a resilient manner to absorb tilting, twisting or compressive stresses, such as are incident to normal operation in an axle suspension such as in instanced above, are identical.

Both types of structure are inexpensively fabricated in the metals referred to for the parts, are inexpensively and quickly assembled to one another, and are also readily and quickly applied to the coupled parts or devices, as at the central connecting shaft or stem 15 or 15'. High frictional coefficient, aluminum on steel mating surfaces of the bushing washer 18 at inner bushing member 12 (or 12'), shaft 15 (or 15') and nut 20 (or 20') are considered to be of controlling importance in the effectiveness of the improvement in operation.

What I claim as my invention is:

1. A bushing for connecting a pair of parts capable of imposing severe tilting or twisting stress on the bushing in a plane including the bushing axis, comprising a rigid annular, circumferentially continuous member adapted to be connected to one of said parts, a shaft coaxially received in the bore of said member and adapted to be connected to the other part, said bore having a generally conical counterbore merging radially and axially inwardly to the bore at an end thereof, and means at opposite ends of said member to hold said member in locked relation to said shaft, including a radially split washer surrounding said shaft and formed generally conical on its outer surface for accurate mating engagement with the surface at an angle of the order of 30° to its axis of said counterbore, and means on said shaft axially outwardly of said washer to exert axial force on the latter, thus to axially force and circumferentially constrict the washer into tight radial gripping and locking engagement with said shaft and rigid member bore in the zone of said counterbore of the latter, said member and shaft being of steel and the washer being of aluminum to afford a coefficient of friction at the gripping and locking engagement surfaces which substantially exceeds the coefficient of friction at other non-bearing type metal-to-metal surfaces.

2. A resilient bushing for connecting a pair of parts capable of imposing severe tilting or twisting stress on the bushing in a plane including the bushing axis, comprising a rigid annular circumferentially continuous inner member adapted to be connected to one of said parts, a rigid annular outer member concentric of said first named member and adapted to be connected to the other part, an annular cushioning sleeve of resiliently deformable material coaxially interposed between said members, a shaft coaxially received in the bore of said inner member, said bore having a generally conical counterbore merging radially and axially inwardly to the bore at an end thereof, and means at opposite ends of said inner member to hold said inner member in locked relation to said shaft, including a radially split washer surrounding said shaft and formed generally conical on its outer surface for accurate mating engagement with the surface at an angle of the order of 30° to its axis of said counterbore, and means on said shaft axially outwardly of said washer to exert axial force on the latter, thus to axially force and circumferentially constrict the washer into tight radial gripping and locking engagement with said shaft and rigid inner member bore in the zone of said counterbore of the latter, said inner member and shaft being of steel and the washer being of aluminum to afford a coefficient of friction at the gripping and locking engagement surfaces which substantially exceeds the coefficient of friction at other non-bearing type metal-to-metal surfaces.

3. A bushing for connecting a pair of parts capable of imposing severe tilting or twisting stress on the bushing in a plane including the bushing axis, comprising a rigid annular, circumferentially continuous member of steel adapted to be connected to one of said parts, a steel shaft coaxially received in the bore of said inner member and adapted to be connected to the other part, said bore having a generally conical counterbore merging radially and axially inwardly to the bore at an end thereof, and means at opposite ends of said member to hold said member in locked relation to said shaft, including an aluminum, radially split washer surrounding said shaft and formed generally conical on its outer surface at an angle of the order of 30° to its axis for accurate mating engagement with the surface of said counterbore, and a nut threaded on said shaft axially outwardly of said washer to exert axial force on the latter, thus to axially force and circumferentially constrict the washer into tight circumferential gripping and locking engagement with said shaft and rigid inner member bore in the zone of said counterbore of the latter.

4. A resilient bushing for connecting a pair of parts capable of imposing severe tilting or twisting stress on the bushing in a plane including the bushing axis, comprising a rigid annular circumferentially continuous inner member of steel adapted to be connected to one of said parts, a rigid annular outer member concentric of said first named member and adapted to be connected to the other part, an annular cushioning sleeve of resiliently deformable material coaxially interposed between said members, a steel shaft coaxially received in the bore of said inner member, said bore having a generally conical counterbore merging radially and axially inwardly to the bore at an end thereof, and means at opposite ends of said inner member to hold said inner member in locked relation to said shaft, including an aluminum, radially split washer surrounding said shaft and formed generally conical on its outer surface at an angle of the order of 30° to its axis for accurate mating engagement with the surface of said counterbore, and a nut threaded on said shaft axially outwardly of said washer to exert axial force on the latter, thus to axially force and circumferentially constrict the washer into tight circumferential gripping and locking engagement with said shaft and rigid inner member bore in the zone of said counterbore of the latter.

References Cited by the Examiner
UNITED STATES PATENTS

| | | | |
|---|---|---|---|
| 1,992,631 | 2/35 | Piquerez | 267—54 X |
| 2,215,476 | 9/40 | Peters | 287—114 |
| 2,413,840 | 1/47 | Mercier | 285—422 X |

FOREIGN PATENTS 869,368  5/61  Great Britain.

ARTHUR L. LA POINT, *Primary Examiner.*